(12) United States Patent
Kook et al.

(10) Patent No.: US 9,670,993 B2
(45) Date of Patent: Jun. 6, 2017

(54) MULTI-STAGE TRANSMISSION FOR VEHICLE

(71) Applicant: Hyundai Motor Company, Seoul (KR)

(72) Inventors: Jae Chang Kook, Whasung-Si (KR); Seong Wook Hwang, Whasung-Si (KR); Hyun Sik Kwon, Whasung-Si (KR); Seong Wook Ji, Whasung-Si (KR); Won Min Cho, Whasung-Si (KR); Kang Soo Seo, Whasung-Si (KR); Myeong Hoon Noh, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 29 days.

(21) Appl. No.: 14/933,289

(22) Filed: Nov. 5, 2015

(65) Prior Publication Data

US 2016/0356352 A1 Dec. 8, 2016

(30) Foreign Application Priority Data

Jun. 8, 2015 (KR) ........................ 10-2015-0080470

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
CPC ..... F16H 2200/2012; F16H 2200/2046; F16H 2200/2097
See application file for complete search history.

(56) References Cited

U.S. PATENT DOCUMENTS

| | | | |
|---|---|---|---|
| 8,038,566 B2 | 10/2011 | Phillips et al. | |
| 8,303,455 B2 | 11/2012 | Gumpoltsberger et al. | |
| 8,968,142 B2 * | 3/2015 | Lippert | F16H 3/66 475/275 |
| 2016/0356355 A1 * | 12/2016 | Kook | F16H 3/66 |

FOREIGN PATENT DOCUMENTS

| | | |
|---|---|---|
| JP | 2014-35057 A | 2/2014 |
| JP | 2014-35059 A | 2/2014 |
| KR | 10-1509726 B1 | 4/2015 |

* cited by examiner

*Primary Examiner* — Sherry Estremsky
(74) *Attorney, Agent, or Firm* — Morgan Lewis & Bockius LLP

(57) ABSTRACT

A multi-stage transmission for vehicle may an input shaft, an output shafts, first to fourth planetary gear devices transmitting rotary force between the input and output shafts, each of them having three rotary elements, and at least six shifting elements connected to the rotary elements of the planetary gear devices, wherein first rotary element of the first planetary gear device is permanently connected to the input shaft, second rotary element is installed to be fixable by any one of the shifting elements, and third rotary element is permanently connected to second rotary element of the second planetary gear device.

8 Claims, 1 Drawing Sheet

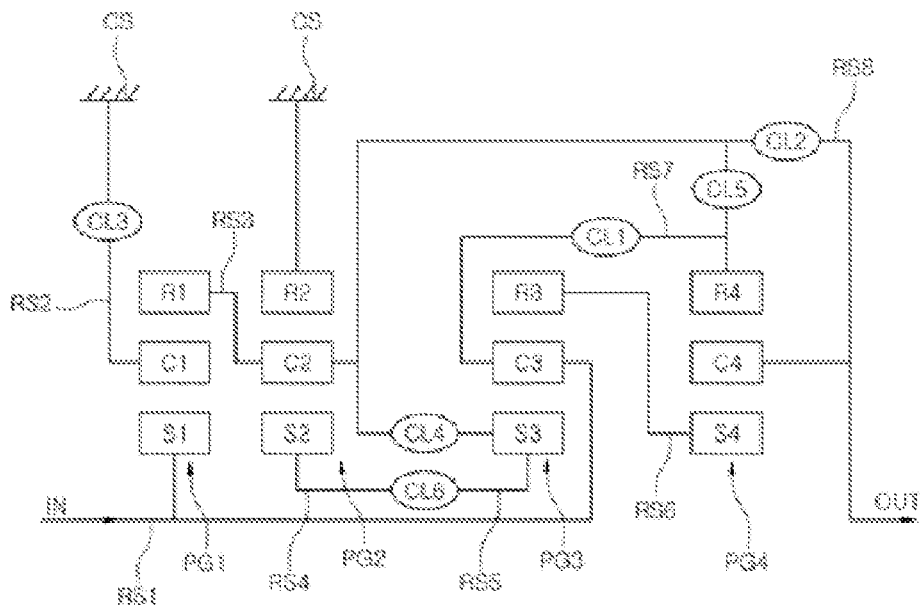

MULTI-STAGE TRANSMISSION FOR VEHICLE

CROSS-REFERENCE TO RELATED APPLICATION

The present application claims priority to Korean Patent Application No. 10-2015-0080470, filed Jun. 8, 2015, the entire contents of which is incorporated herein for all purposes by this reference.

BACKGROUND OF THE INVENTION

Field of the Invention

The present invention relates to a multi-stage transmission for a vehicle, and more particularly, to a multi-stage transmission technology capable of increasing fuel efficiency of a vehicle by as many shift stages as possible using few components and simple configuration as far as possible.

Description of Related Art

Recently, rising of oil price has become a factor to push automobile manufactures to participate in an unlimited competition, in the case of an engine, efforts to reduce weight and improve fuel efficiency of an engine through a technology such as downsizing and the like have been conducted.

Meanwhile, among methods applying to a transmission of a vehicle for increasing fuel efficiency of a vehicle, there is a method of allowing an engine to be driven at more efficient driving points through a multi-staging of a transmission to ultimately improve fuel efficiency.

Further, the multi-staging of a transmission as described above allows an engine to be driven in a relatively low revolution per minute (RPM) range to further improve silence of the vehicle.

However, since mounting feature, price, weight, and transfer efficiency of a transmission may be rather deteriorated by increasing the number of components of a transmission as increasing of its shifting stages, in order to maximize fuel efficiency improving effect through increasing shift stages of a transmission, how to design a transmission structure capable of producing maximum efficiency with a small number of components and a comparatively simple configuration is an important matter.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a multi-stage transmission for vehicle capable of maximizing fuel efficiency improvement of a vehicle through allowing an engine to be operated at an optimal driving points and improving silence of a vehicle through a silent driving of an engine, by implementing at least ten forward stages and one reverse stage with a comparatively small number of components and a simple configuration.

According to various aspects of the present invention, a multi-stage transmission for a vehicle may include an input shaft and an output shaft; a first to fourth planetary gear devices provided between the input shaft and the output shaft so as to transfer torque and each planetary gear devices having three rotating elements; and at least six shifting elements connected to rotating elements of the first to fourth planetary gear devices. A first rotating element of the first planetary gear device may be continuously connected to the input shaft, a second rotating element of the first planetary gear device may be installed to be fixable by one shifting element of the at least six shifting elements, and a third rotating element of the first planetary gear device may be continuously connected to a second rotating element of the second planetary gear device. A first rotating element of the second planetary gear device may be selectively connected to a first rotating element of the third planetary gear device, the second rotating element of the second planetary gear device may be selectively connected to the first rotating element of the third planetary gear device, a second rotating element of the fourth planetary gear device and a third rotating element of the fourth planetary gear device, and a third rotating element of the second planetary gear device may be continuously fixed. A second rotating element of the third planetary gear device may be continuously connected to the input shaft and selectively connected to the third rotating element of the fourth planetary gear device, and a third rotating element of the third planetary gear device is continuously connected to a first rotating element of the fourth planetary gear device. The second rotating element of the fourth planetary gear device may be continuously connected to the output shaft.

The first planetary gear device, the second planetary gear device, the third planetary gear device, and the fourth planetary gear device may be sequentially disposed in an axial direction of the input shaft and the output shaft.

The second rotating element of the first planetary gear device may be installed to be fixable to a transmission case by a third clutch from among the at least six shifting elements, and the other shifting elements may be configured to form a selectively connection structure among the rotating elements of the planetary gear devices.

A first clutch from among the at least six shifting elements may form a selective connection structure between the second rotating element of the third planetary gear device and the third rotating element of the fourth planetary gear device, a second clutch from among the at least six shifting elements may form a selective connection structure between the second rotating element of the second planetary gear device and the second rotating element of the fourth planetary gear device, a fourth clutch from among the at least six shifting elements may form a selective connection structure between the second rotating element of the second planetary gear device and the first rotating element of the third planetary gear device, a fifth clutch from among the at least six shifting elements may form a selective connection structure between the second rotating element of the second planetary gear device and the third rotating element of the fourth planetary gear device, and a sixth clutch from among the at least six shifting elements may form a selective connection structure between the first rotating element of the second planetary gear device and the first rotating element of the third planetary gear device.

According to various aspects of the present invention, a multi-stage transmission for vehicle may include: a first planetary gear device, a second planetary gear device, a third planetary gear device and a fourth planetary gear device each having three rotating elements; six shifting elements configured to selectively provide frictional force; and a first to eighth rotating shafts connected to the rotating elements of the planetary gear devices, wherein the first rotating shaft may be an input shaft directly connected to a first rotating element of the first planetary gear device and a second rotating element of the third planetary gear device, the second rotating shaft may be directly connected to a second rotating element of the first planetary gear device, the third rotating shaft may be directly connected to a third rotating element of the first planetary gear device and a second rotating element of the second planetary gear device, the fourth rotating shaft may be directly connected to a first rotating element of the second planetary gear device, the fifth rotating shaft may be directly connected to a first rotating element of the third planetary gear device, the sixth rotating shaft may be directly connected to a third rotating element of the third planetary gear device and a first rotating element of the fourth planetary gear device, the seventh rotating shaft may be directly connected to a third rotating element of the fourth planetary gear device, and the eighth rotating shaft may be an output shaft directly connected to a second rotating element of the fourth planetary gear device, wherein the six shifting elements may include a first to sixth clutches, the first clutch may be disposed between the first rotating shaft and the seventh rotating shaft, a second clutch may be disposed between the third rotating shaft and the eighth rotating shaft, the third clutch may be disposed between the second rotating shaft and a transmission case, the fourth clutch may be disposed between the third rotating shaft and the fifth rotating shaft, the fifth clutch may be disposed between the third rotating shaft and the seventh rotating shaft, and the sixth clutch may be disposed between the fourth rotating shaft and the fifth rotating shaft.

The first planetary gear device, the second planetary gear device, the third planetary gear device, and the fourth planetary gear device may be sequentially disposed in an axial direction of the input shaft and the output shaft.

The first clutch may be disposed to selectively connect between the second rotating element of the third planetary gear device and the third rotating element of the fourth planetary gear device, the second clutch may be disposed to selectively connect between the second rotating element of the second planetary gear device and the second rotating element of the fourth planetary gear device, the fourth clutch may be disposed to selectively connect between the second rotating element of the second planetary gear device and the first rotating element of the third planetary gear device, the fifth clutch may be disposed to selectively connect between the second rotating element of the second planetary gear device and the third rotating element of the fourth planetary gear device, and the sixth clutch may be disposed to selectively connect between the first rotating element of the second planetary gear device and the first rotating element of the third planetary gear device.

According to the present invention as set forth above, the multi-stage transmission for vehicle capable of maximizing fuel efficiency improvement of a vehicle through allowing an engine to be operated at optimal driving points and improving silence of a vehicle through a silent driving of an engine, by implementing at least ten forward stages and one reverse stage with a comparatively small number of components and a simple configuration.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a diagram illustrating a constitution of an exemplary multi-stage transmission for a vehicle according to the present invention.

FIG. 2 is a mode table for the transmission depicted in the FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring FIG. 1, an exemplary embodiment of a multi-stage transmission of the present invention is configured to include an input shaft IN and an output shaft OUT, a first planetary gear device PG1, a second planetary gear device PG2, a third planetary gear device PG3, and fourth planetary gear device PG4 provided between the input shaft and the output shaft so as to transfer torque and each planetary gear device including three rotating elements, and at least six shifting elements connected to rotating elements of the planetary gear devices.

A first rotating element S1 of the first planetary gear device PG1 may be continuously connected to the input shaft IN, a second rotating element C1 of the first planetary gear device PG1 may be installed to be fixable by one shifting element of the at least six shifting elements, and a third rotating element R1 of the first planetary gear device PG1 may be continuously connected to a second rotating element C2 of the second planetary gear device PG2.

A first rotating element S2 of the second planetary gear device PG2 may be selectively connected to a first rotating element S3 of the third planetary gear device PG3, the second rotating element C2 of the second planetary gear device PG2 may be selectively connected to the first rotating element S3 of the third planetary gear device PG3, a second rotating element C4 of the fourth planetary gear device PG4 and a third rotating element R4 of the fourth planetary gear device PG4, and a third rotating element R2 of the second planetary gear device PG2 may be continuously fixed.

A second rotating element C3 of the third planetary gear device PG3 may be continuously connected to the input shaft IN and selectively connected to the third rotating element R4 of the fourth planetary gear device PG4, a third rotating element R3 of the third planetary gear device PG3 may be continuously connected to a first rotating element S4 of the fourth planetary gear device PG4. The second rotating element C4 of the fourth planetary gear device PG4 may be continuously connected to the output shaft OUT.

In this embodiment, the first planetary gear device PG1, the second planetary gear device PG2, the third planetary gear device PG3, and the fourth planetary gear device PG4 are sequentially disposed in an axial direction of the input shaft IN and the output shaft OUT.

The second rotating element C1 of the first planetary gear device PG1 may be installed to be fixable to a transmission case CS by a third clutch CL3 from among the at least six shifting elements.

Therefore, the third clutch CL3 works as a brake to limit or lease rotating of the second rotating element C1 of the first planetary gear device PG1.

The other shifting elements are configured to form a selective connection structure among the rotating elements of the planetary gear devices.

A first clutch CL1 from among the at least six shifting elements may form a selective connection structure between the second rotating element C3 of the third planetary gear device PG3 and the third rotating element R4 of the fourth planetary gear device PG4, a second clutch CL2 from among the at least six shifting elements may form a selective connection structure between the second rotating element C2 of the second planetary gear device PG2 and the second rotating element C4 of the fourth planetary gear device PG4, a fourth clutch CL4 from among the at least six shifting elements may form a selective connection structure between the second rotating element C2 of the second planetary gear device PG2 and the first rotating element S3 of the third planetary gear device PG3, a fifth clutch CL5 from among the at least six shifting elements may form a selective connection structure between the second rotating element C2 of the second planetary gear device PG2 and the third rotating element R4 of the fourth planetary gear device PG4, and a sixth clutch CL6 from among the at least six shifting elements may form a selective connection structure between the first rotating element S2 of the second planetary gear device PG2 and the first rotating element S3 of the third planetary gear device PG3.

In this embodiment, the first rotating element S1, the second rotating element C1, and the third rotating element R1 of the first planetary gear device PG1 are corresponding to a first sun gear, a first carrier, and a first ring gear respectively, the first rotating element S2, the second rotating element C2, and the third rotating element R2 of the second planetary gear device PG2 are corresponding to a second sun gear, a second carrier, and a second ring gear respectively, the first rotating element S3, the second rotating element C3, and the third rotating element R3 of the third planetary gear device PG3 are corresponding to a third sun gear, a third carrier, and a third ring gear respectively, and the first rotating element S4, the second rotating element C4, and the third rotating element R4 of the fourth planetary gear device PG4 are corresponding to a fourth sun gear, a fourth carrier, and a fourth ring gear respectively.

The multi-stage transmission for a vehicle configured as described above may also be represented as follows.

In other words, the multi-stage transmission for a vehicle according to various embodiments of the present invention is configured to include a first planetary gear device PG1, a second planetary gear device PG2, a third planetary gear device PG3, and a fourth planetary gear device PG4 each having three rotating elements, six shifting elements able to selectively provide friction force, and a first to eighth rotating shafts connected to the rotating elements of the planetary gear devices.

Here, the first rotating shaft RS1 may be an input shaft directly connected to a first rotating element S1 of the first planetary gear device PG1 and a second rotating element C3 of the third planetary gear device PG3, the second rotating shaft RS2 may be directly connected to a second rotating element C1 of the first planetary gear device PG1, the third rotating shaft RS3 may be directly connected to a third rotating element R1 of the first planetary gear device PG1 and a second rotating element C2 of the second planetary gear device PG2, the fourth rotating shaft RS4 may be directly connected to a first rotating element S2 of the second planetary gear device PG2, the fifth rotating shaft RS5 may be directly connected to a first rotating element S3 of the third planetary gear device PG3, the sixth rotating shaft RS6 may be directly connected to a third rotating element R3 of the third planetary gear device PG3 and a first rotating element S4 of the fourth planetary gear device PG4, the seventh rotating shaft RS7 may be directly connected to a third rotating element R4 of the fourth planetary gear device PG4, and the eighth rotating shaft RS8 may be an output shaft OUT directly connected to a second rotating element C4 of the fourth planetary gear device PG4.

In addition, a first clutch CL1 of the six shifting elements may be disposed between the first rotating shaft RS1 and the seventh rotating shaft RS7, a second clutch CL2 of the six shifting elements may be disposed between the third rotating shaft RS3 and the eighth rotating shaft RS8, a third clutch CL3 of the six shifting elements may be disposed between the second rotating shaft RS2 and a transmission case CS, a fourth clutch CL4 of the six shifting elements may be disposed between the third rotating shaft RS3 and the fifth rotating shaft RS5, a fifth clutch CL5 of the six shifting elements may be disposed between the third rotating shaft RS3 and the seventh rotating shaft RS7, and a sixth clutch CL6 of the six shifting elements may be disposed between the fourth rotating shaft RS4 and the fifth rotating shaft RS5.

The multi-stage transmission for a vehicle according to an exemplary embodiment of the present invention including four simple planetary gear devices and six shifting elements as described above may implement ten forward stages and one reverse stage based on the mode table depicted in FIG. 2 with comparatively small number of components and a simple configuration, so that fuel efficiency and silence of the vehicle are able to be improved, thereby making it possible to increase salability of the vehicle.

Although the exemplary embodiments of the present invention have been described for illustrative purposes, a person skilled in the art will appreciate that various modifications, additions and substitutions are possible, without departing from the scope and spirit of the present invention as disclosed in the accompanying claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-stage transmission for a vehicle, comprising:

an input shaft and an output shaft;

a first to fourth planetary gear devices provided between the input shaft and the output shaft to transfer torque and, each planetary gear devices having three rotating elements; and at least six shifting elements connected to rotating elements of the first to fourth planetary gear devices, wherein a first rotating element of the first planetary gear device is continuously connected to the input shaft, a second rotating element of the first planetary gear device is installed to be fixable by one shifting element of the at least six shifting elements, and a third rotating element of the first planetary gear device is continuously connected to a second rotating element of the second planetary gear device, wherein a first rotating element of the second planetary gear device is selectively connected to a first rotating element of the third planetary gear device, the second rotating element of the second planetary gear device is selectively connected to the first rotating element of the third planetary gear device, a second rotating element of the fourth planetary gear device and a third rotating element of the fourth planetary gear device, and a third rotating element of the second planetary gear device is continuously fixed, wherein a second rotating element of the third planetary gear device is continuously connected to the input shaft and selectively connected to the third rotating element of the fourth planetary gear device, and a third rotating element of the third planetary gear device is continuously connected to a first rotating element of the fourth planetary gear device, and wherein the second rotating element of the fourth planetary gear device is continuously connected to the output shaft.

2. The multi-stage transmission for the vehicle of claim 1, wherein the first planetary gear device, the second planetary gear device, the third planetary gear device, and the fourth planetary gear device are sequentially disposed in an axial direction of the input shaft and the output shaft.

3. The multi-stage transmission for the vehicle of claim 2, wherein the second rotating element of the first planetary gear device is installed to be fixable to a transmission case by a third clutch of the at least six shifting elements; and the other shifting elements are configured to form a selective connection structure among the rotating elements of the planetary gear devices.

4. The multi-stage transmission for the vehicle of claim 3, wherein a first clutch of the at least six shifting elements forms a selective connection structure between the second rotating element of the third planetary gear device and the third rotating element of the fourth planetary gear device, a second clutch of the at least six shifting elements forms a selective connection structure between the second rotating element of the second planetary gear device and the second rotating element of the fourth planetary gear device, a fourth clutch of the at least six shifting elements forms a selective connection structure between the second rotating element of the second planetary gear device and the first rotating element of the third planetary gear device, a fifth clutch of the at least six shifting elements forms a selective connection structure between the second rotating element of the second planetary gear device and the third rotating element of the fourth planetary gear device, and a sixth clutch of the at least six shifting elements forms a selective connection structure between the first rotating element of the second planetary gear device and the first rotating element of the third planetary gear device.

5. A multi-stage transmission for a vehicle, comprising:

a first planetary gear device, a second planetary gear device, a third planetary gear device, and a fourth planetary gear device each having three rotating elements;

six shifting elements configured to selectively provide frictional force; and a first to eighth rotating shafts connected to the rotating elements of the planetary gear devices, wherein the first rotating shaft is an input shaft directly connected to a first rotating element of the first planetary gear device and a second rotating element of the third planetary gear device, the second rotating shaft is directly connected to a second rotating element of the first planetary gear device, the third rotating shaft is directly connected to a third rotating element of the first planetary gear device and a second rotating element of the second planetary gear device, the fourth rotating shaft is directly connected to a first rotating element of the second planetary gear device, the fifth rotating shaft is directly connected to a first rotating element of the third planetary gear device, the sixth rotating shaft is directly connected to a third rotating element of the third planetary gear device and a first rotating element of the fourth planetary gear device, the seventh rotating shaft is directly connected to a third rotating element of the fourth planetary gear device, and the eighth rotating shaft is an output shaft directly connected to a second rotating element of the fourth planetary gear device, wherein a first clutch of the six shifting elements is disposed between the first rotating shaft and the seventh rotating shaft, a second clutch of the six shifting elements is disposed between the third rotating shaft and the eighth rotating shaft, a third clutch of the six shifting elements is disposed between the second rotating shaft and a transmission case, a fourth clutch of the six shifting elements is disposed between the third rotating shaft and the fifth rotating shaft, a fifth clutch of the six shifting elements is disposed between the third rotating shaft and the seventh rotating shaft, and a sixth clutch of the six shifting elements is disposed between the fourth rotating shaft and the fifth rotating shaft.

6. The multi-stage transmission for the vehicle of claim 5, wherein the first planetary gear device, the second planetary gear device, the third planetary gear device, and the fourth planetary gear device are sequentially disposed in an axial direction of the input shaft and the output shaft.

7. The multi-stage transmission for the vehicle of claim 5, wherein the first clutch is disposed to selectively connect between the second rotating element of the third planetary gear device and the third rotating element of the fourth planetary gear device, the second clutch is disposed to selectively connect between the second rotating element of the second planetary gear device and the second rotating element of the fourth planetary gear device, the fourth clutch is disposed to selectively connect between the second rotating element of the second planetary gear device and the first rotating element of the third planetary gear device, the fifth clutch is disposed to selectively connect between the second rotating element of the second planetary gear device and the third rotating element of the fourth planetary gear device, and the sixth clutch is disposed to selectively connect between the first rotating element of the second planetary gear device and the first rotating element of the third planetary gear device.

8. The multi-stage transmission for the vehicle of claim 5, wherein the third rotating element of the secondary planetary gear device is continuously fixed to the transmission case.

* * * * *